(12) United States Patent
Bae et al.

(10) Patent No.: US 11,973,704 B2
(45) Date of Patent: *Apr. 30, 2024

(54) SYSTEMS, METHODS, AND APPARATUS FOR CROSS-CARRIER SCHEDULING

(71) Applicant: Samsung Electronics Co., Ltd., Suwon-si (KR)

(72) Inventors: Jung Hyun Bae, San Diego, CA (US); Hamid Saber, San Diego, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/084,535

(22) Filed: Dec. 19, 2022

(65) Prior Publication Data

US 2023/0122870 A1    Apr. 20, 2023

Related U.S. Application Data

(63) Continuation of application No. 17/377,365, filed on Jul. 15, 2021.
(Continued)

(51) Int. Cl.
*H04L 5/00*       (2006.01)
*H04W 48/10*      (2009.01)
(Continued)

(52) U.S. Cl.
CPC .......... *H04L 5/0033* (2013.01); *H04W 48/10* (2013.01); *H04W 72/23* (2023.01); *H04W 72/27* (2023.01)

(58) Field of Classification Search
None
See application file for complete search history.

(56) References Cited

U.S. PATENT DOCUMENTS

| 10,064,171 B2 | 8/2018 | Suzuki et al. |
| 10,321,410 B2 | 6/2019 | Park |

(Continued)

FOREIGN PATENT DOCUMENTS

| IN | 202127002212 | 2/2021 |
| KR | 20190129721 A | 11/2019 |

OTHER PUBLICATIONS

Notice of Allowance for U.S. Appl. No. 17/377,365, dated May 8, 2023.
(Continued)

*Primary Examiner* — Hong S Cho
(74) *Attorney, Agent, or Firm* — Renaissance IP Law Group LLP

(57) ABSTRACT

A device may include a transceiver configured to access a communication network including a primary cell and a secondary cell, and a device controller configured to receive, on the secondary cell, scheduling information for the primary cell, and monitor a common search space for the primary cell. The device controller may be configured to selectively monitor the common search space for broadcast information. The device controller may be configured to selectively monitor the common search space based on a type of the common search space on the primary cell. A method may include scheduling, by a first scheduling mechanism, a primary cell, wherein the first scheduling mechanism comprises scheduling the primary cell by a secondary cell, scheduling, by a second scheduling mechanism, the primary cell, and deactivating the secondary cell based on switching from the first scheduling mechanism to the second scheduling mechanism. The second scheduling mechanism may include self-scheduling.

20 Claims, 8 Drawing Sheets

Related U.S. Application Data

(60) Provisional application No. 63/057,288, filed on Jul. 27, 2020.

(51) Int. Cl.
  *H04W 72/23* (2023.01)
  *H04W 72/27* (2023.01)

(56) References Cited

U.S. PATENT DOCUMENTS

| | | | |
|---|---|---|---|
| 10,674,522 B2* | 6/2020 | Wang | H04W 28/06 |
| 10,716,133 B2* | 7/2020 | Chatterjee | H04L 5/0053 |
| 11,064,513 B1* | 7/2021 | Babaei | H04W 72/23 |
| 2014/0198746 A1* | 7/2014 | Ahn | H04L 5/001 |
| | | | 370/329 |
| 2016/0135181 A1* | 5/2016 | Nogami | H04L 5/0094 |
| | | | 370/329 |
| 2019/0223164 A1 | 7/2019 | He et al. | |
| 2020/0305134 A1 | 9/2020 | Noh et al. | |
| 2020/0359388 A1 | 11/2020 | He et al. | |
| 2021/0321443 A1* | 10/2021 | Takeda | H04W 72/23 |
| 2022/0053532 A1* | 2/2022 | Baldemair | H04W 72/1273 |
| 2023/0041809 A1* | 2/2023 | Harada | H04L 1/0067 |
| 2023/0085896 A1* | 3/2023 | Takeda | H04W 24/08 |
| | | | 370/329 |

OTHER PUBLICATIONS

Office Action for U.S. Appl. No. 17/377,365, dated Oct. 17, 2022.
Final Office Action for U.S. Appl. No. 17/377,365, dated Jan. 30, 2023.
Corrected Notice of Allowability for U.S. Appl. No. 17/377,365, dated Sep. 25, 2023.
Notice of Allowance for U.S. Appl. No. 17/377,365, dated Oct. 17, 2023.

\* cited by examiner

SYSTEMS, METHODS, AND APPARATUS FOR CROSS-CARRIER SCHEDULING

CROSS-REFERENCE TO RELATED APPLICATION

This application is a continuation of U.S. patent application Ser. No. 17/377,365 filed Jul. 15, 2021 which claims priority to, and the benefit of, U.S. Provisional Patent Application Ser. No. 63/057,288 titled "NR Dynamic Spectrum Sharing" filed Jul. 27, 2020, both of which are incorporated by reference.

TECHNICAL AREA

This disclosure relates generally to communication systems, and specifically to systems, methods, and apparatus for systems, methods, and apparatus for cross-carrier scheduling.

BACKGROUND

Communication networks may use carrier aggregation (CA) techniques in which two or more component carriers (CCs) may be combined to provide greater bandwidth than a single CC. When using aggregated carriers, control information for scheduling a data transfer may be sent on the same CC that will transfer the data. This may be referred to as self-scheduling. Alternatively, a data transfer on one CC may be scheduled with control information sent on a different CC. This may be referred to as cross-carrier scheduling (CCS).

The above information disclosed in this Background section is only for enhancement of understanding of the background of the invention and therefore it may contain information that does not constitute prior art.

SUMMARY

A method for cross-carrier scheduling in a communication network may include scheduling, by a first scheduling mechanism, a primary cell, wherein the first scheduling mechanism may include scheduling the primary cell by a secondary cell, monitoring a common search space for the primary cell, scheduling, by a second scheduling mechanism, the primary cell, deactivating the secondary cell, and coordinating switching from the first scheduling mechanism to the second scheduling mechanism and deactivating the secondary cell. Monitoring the common search space may include monitoring the common search space for broadcast information. The secondary cell may be a first secondary cell, and the second scheduling mechanism may include scheduling the primary cell by a second secondary cell.

A method for cross-carrier scheduling in a communication network may include scheduling, by a first scheduling mechanism, a primary cell, wherein the first scheduling mechanism may include scheduling the primary cell by a secondary cell, scheduling, by a second scheduling mechanism, the primary cell, deactivating the secondary cell, and coordinating switching from the first scheduling mechanism to the second scheduling mechanism and deactivating the secondary cell. The second scheduling mechanism may include self-scheduling by the primary cell. The secondary cell may be a first secondary cell, and the second scheduling mechanism may include scheduling the primary cell by a second secondary cell. The second secondary cell may be configured by radio resource control signaling. The second secondary cell may be configured by a medium access control process. The second secondary cell may be configured as a default secondary cell.

A method for cross-carrier scheduling in a communication network may include receiving, on a secondary cell, scheduling information for a primary cell, scheduling the primary cell based on the scheduling information, and monitoring a common search space for the primary cell. Monitoring the common search space may include monitoring the common search space for broadcast information. Monitoring the common search space may include monitoring the common search space based on a type of the common search space for the primary cell. The method may further include scheduling a first downlink channel for a first cell based on a downlink control information (DCI), scheduling a second downlink channel for a second cell based on the DCI, and scheduling an uplink channel for a first acknowledgment for the first downlink channel. The first cell may include the primary cell, and the second cell may include the secondary cell. The method may further include scheduling the uplink channel for a second acknowledgment for the second downlink channel. The DCI may include a field comprising a first parameter for the uplink channel and a second parameter for the uplink channel. The DCI may include a first field comprising a first parameter for the uplink channel and a second field comprising a second parameter for the uplink channel. The uplink channel may be a first uplink channel, and the method further may include scheduling a second uplink channel for a second acknowledgment for the second downlink channel. The DCI may include a field comprising a first parameter for the first and second uplink channels and a second parameter for the first and second uplink channels. The DCI may include a first field comprising a first parameter for the first and second uplink channels and a second field comprising a second parameter for the first and second uplink channels.

The method may further include scheduling a first downlink channel for a first cell based on a downlink control information (DCI), scheduling a second downlink channel for a second cell based on the DCI, and constructing an acknowledgment codebook for the first cell and the second cell based on a counter index in the DCI, a first serving cell index for the first cell, and a second serving cell index for the second cell. A first acknowledgment of the first downlink channel and a second acknowledgment of the second downlink channel may be transmitted in the same physical uplink control channel (PUCCH). The acknowledgment codebook may be constructed based on a maximum of the first serving cell index and the second serving cell index. The acknowledgment codebook may be constructed based on a minimum of the first serving cell index and the second serving cell index. Constructing the acknowledgment codebook may include generating a first entry in the acknowledgment codebook for an acknowledgment for the first cell based on the first serving cell index, generating a reserved entry in the acknowledgment codebook corresponding to the second cell based on the second serving cell index, and replacing the reserved entry in the acknowledgment codebook with an acknowledgment for the second cell. The counter index may be a first counter index, and constructing the acknowledgment codebook may include constructing the acknowledgment codebook based on a second counter index in the DCI. The method may further include scheduling a first downlink channel for a first cell based on a downlink control information (DCI), scheduling a second downlink channel for a second cell based on the DCI, generating a first entry for the first cell in an acknowledgment codebook based on a first counter index in the DCI, and generating a second entry for the second cell in the acknowledgment codebook based on a second counter index in the DCI. A first acknowledgment of the first downlink channel and a second acknowledgment of the second downlink channel may be transmitted in the same physical uplink control channel (PUCCH).

A device may include a transceiver configured to access a communication network including a primary cell and a secondary cell, and a device controller configured to receive, on the secondary cell, scheduling information for the primary cell, and monitor a common search space for the primary cell. The device controller may be configured to selectively monitor the common search space for broadcast information. The device controller may be configured to selectively monitor the common search space based on a type of the common search space on the primary cell.

A device may include a transceiver configured to access a communication network including a primary cell and a secondary cell, and a device controller configured to receive, on the secondary cell, scheduling information for the primary cell, and receive overbooked control information on the secondary cell. The device controller may be configured to select one or more candidates from the overbooked control information. The device controller may be configured to receive overbooked control information on the primary cell. The secondary cell may be a first secondary cell, and the device controller may be configured to receive overbooked control information on a second secondary cell.

A method for cross-carrier scheduling in a communication network may include scheduling, by a first scheduling mechanism, a primary cell, wherein the first scheduling mechanism may include scheduling the primary cell by a secondary cell, scheduling, by a second scheduling mechanism, the primary cell, and deactivating the secondary cell based on switching from the first scheduling mechanism to the second scheduling mechanism. The second scheduling mechanism may include self-scheduling by the primary cell. The secondary cell may be a first secondary cell, and the second scheduling mechanism may include scheduling the primary cell by a second secondary cell. The second secondary cell may be configured by radio resource control signaling. The second secondary cell may be configured by a medium access control process. The second secondary cell may be configured as a default secondary cell.

A method for cross-carrier scheduling in a communication network may include scheduling a first downlink channel for a first cell based on a downlink control information (DCI), scheduling a second downlink channel for a second cell based on the DCI, and scheduling an uplink channel for a first acknowledgment for the first downlink channel. The method may further include scheduling the uplink channel for a second acknowledgment for the second downlink channel. The DCI may include a field including a first parameter for the uplink channel and a second parameter for the uplink channel. The DCI may include a first field including a first parameter for the uplink channel and a second field including a second parameter for the uplink channel. The uplink channel may be a first uplink channel, and the method may further include scheduling a second uplink channel for a second acknowledgment for the second downlink channel. The DCI may include a field comprising a first parameter for the first and second uplink channels and a second parameter for the first and second uplink channels. The DCI may include a first field comprising a first parameter for the first and second uplink channels and a second field comprising a second parameter for the first and second uplink channels.

A method for cross-carrier scheduling in a communication network may include scheduling a first downlink channel for a first cell based on a downlink control information (DCI), scheduling a second downlink channel for a second cell based on the DCI, and constructing an acknowledgment codebook for the first cell and the second cell based on a counter index in the DCI, a first serving cell index for the first cell, and a second serving cell index for the second cell. A first acknowledgment of the first downlink channel and a second acknowledgment of the second downlink channel may be transmitted in the same physical uplink control channel (PUCCH). The acknowledgment codebook may be constructed based on a maximum of the first serving cell index and the second serving cell index. The acknowledgment codebook may be constructed based on a minimum of the first serving cell index and the second serving cell index. Constructing the acknowledgment codebook may include generating a first entry in the acknowledgment codebook for an acknowledgment for the first cell based on the first serving cell index, generating a reserved entry in the acknowledgment codebook corresponding to the second cell based on the second serving cell index, and replacing the reserved entry in the acknowledgment codebook with an acknowledgment for the second cell. The counter index may be a first counter index, and constructing the acknowledgment codebook may include constructing the acknowledgment codebook based on a second counter index in the DCI.

A method for cross-carrier scheduling in a communication network may include scheduling a first downlink channel for a first cell based on a downlink control information (DCI), scheduling a second downlink channel for a second cell based on the DCI, generating a first entry for the first cell in an acknowledgment codebook based on a first counter index in the DCI, and generating a second entry for the second cell in the acknowledgment codebook based on a second counter index in the DCI. A first acknowledgment of the first downlink channel and a second acknowledgment of the second downlink channel may be transmitted in the same physical uplink control channel (PUCCH).

A method for cross-carrier scheduling in a communication network may include scheduling, by a first scheduling mechanism, a primary cell, wherein the first scheduling mechanism may include scheduling the primary cell by a secondary cell, monitoring a common search space for the primary cell, scheduling, by a second scheduling mechanism, the primary cell, deactivating the secondary cell, and coordinating switching from the first scheduling mechanism to the second scheduling mechanism with deactivating the secondary cell.

BRIEF DESCRIPTION OF THE DRAWINGS

The figures are not necessarily drawn to scale and elements of similar structures or functions are generally represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Overview

Figure 1:
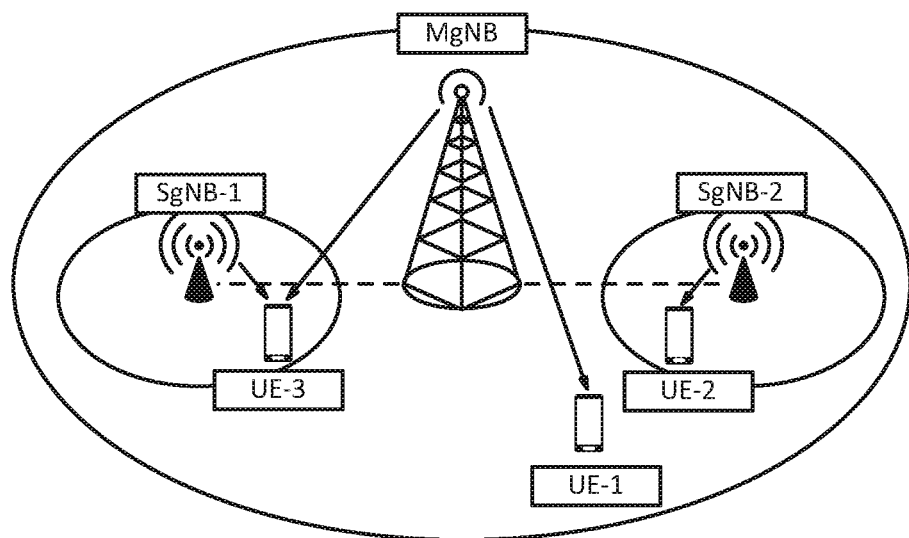
FIG. 1 illustrates an example embodiment of an NN-DC deployment in accordance with the disclosure.

This disclosure encompasses numerous inventive principles relating to cross-carrier scheduling (CCS). These principles may have independent utility and may be embodied individually, and not every embodiment may utilize every principle. Moreover, the principles may also be embodied in various combinations, some of which may amplify the benefits of the individual principles in a synergistic manner.

In some embodiments, a primary cell may be scheduled by a secondary cell using CCS, for example, to reduce the burden of control signaling on the primary cell (e.g., to reduce physical downlink control channel (PDCCH) transmissions on the primary cell). Since a PDCCH may not be needed on a scheduled cell, a user equipment (UE) may not monitor a common search space for a PDCCH on a scheduled cell. However, for initial access and/or random access procedures, a UE may need certain broadcast and/or system information that may only be obtained by monitoring a common search space on the primary cell. Therefore, in some embodiments in accordance with the disclosure, a UE may monitor a common search space for a primary cell when the primary cell is configured as a scheduled cell.

Some embodiments may only allow PDCCH overbooking on primary cells. However, when secondary cells are used to schedule primary cells, a greater load may be placed on the secondary cells. Thus, in some embodiments in accordance with the disclosure, PDCCH overbooking may be allowed on secondary cells that are configured as scheduling cells.

In some embodiments, if a secondary cell that schedules a primary cell is deactivated before another scheduling mechanism is configured for the primary cell, it may be problematic for the scheduling of the primary cell. Therefore, in some embodiments in accordance with the disclosure, one or more techniques may be used to prevent the deactivation of a scheduling secondary cell from interfering with the operation of a scheduled primary cell. For example, the deactivation of the secondary cell may be coordinated with the reconfiguration of another secondary cell to schedule the primary cell, the primary cell may be configured for self-scheduling, another secondary cell may be configured as a fallback cell to schedule the primary cell, and/or other techniques may be implemented.

Some embodiments may allow cross-carrier scheduling of downlink transmissions (e.g., physical downlink shared channel (PDSCH) transmissions) on multiple cells by a single downlink control information (DCI) in a PDCCH. However, a UE may need to provide a separate acknowledgment for the downlink transmission on each cell, and therefore, the DCI may configure uplink resources for transmitting the acknowledgments. In some embodiments in accordance with the disclosure, a single physical uplink control channel (PUCCH) may be used for all of the acknowledgments for the downlink transmissions scheduled by a single DCI. In such embodiments, the DCI may include a single entry for one or more parameters for the PUCCH. In some other embodiments in accordance with the disclosure, multiple PUCCH may be used for the acknowledgments, and the DCI may include multiple entries for the PUCCHs.

In some embodiments, a UE may use a counter index (e.g., a counter downlink assignment index (C-DAI)) provided in a DCI to detect missed transmissions (e.g., lost scheduling messages) when constructing an acknowledgment codebook. However, in embodiments that allow a single DCI to schedule multiple downlink transmissions on multiple cells, it may be difficult to determine the value of C-DAI to use in the DCI. In some embodiments in accordance with the disclosure, a DCI that schedules multiple cells may include multiple C-DAIs that may be used to construct a codebook as if each C-DAI was provided in a separate DCI for each cell. In some other embodiments in accordance with the disclosure, a DCI that schedules multiple cells may include a single C-DAI. In such embodiments, a UE may substitute a manipulated serving cell index (e.g., a minimum or maximum index) into an algorithm for constructing the codebook. In such embodiments, the algorithm may reserve (e.g., skip) one or more codebook entries for certain serving cells. The reserved entries may be replaced with actual acknowledgment values for the serving cells.

Example Embodiments

Some example embodiments of systems, apparatus, devices, processes, methods, and/or the like illustrating some possible implementation details according to the disclosure are described herein. These examples are provided for purposes of illustrating the principles of this disclosure, but the principles are not limited to or defined by these embodiments, implementation details, and/or the like. For example, some embodiments may be described in the context of 5G and/or New Radio (NR) wireless communication systems, but the principles may also be applied to any other types of wired and/or wireless systems including 3G, 4G and/or future generations of wireless networks, and/or any other communication systems that may implement cross-carrier scheduling for carrier aggregation, dual connectivity, and/or the like, Carrier Aggregation Wireless networks may use carrier aggregation (CA) to increase the rate at which data may be exchanged between devices. In a CA scheme, two or more component carriers (CCs) may be combined into one data channel that may have a greater bandwidth than a single CC. To implement CA, a device such as a user equipment (UE) may use CCs from multiple cells, which may be referred to as serving cells. A UE may initially find and connect to a first cell which may be referred to as a primary cell or PCell. The primary cell may communicate with the UE using a first CC. One or more additional cells, which may be referred to as secondary cells or SCells, may then be configured to communicate with the UE using an additional CC per secondary cell. Thus, the UE may simultaneously exchange data with the network using multiple CCs on multiple cells, thereby aggregating the bandwidth of the component carriers.

Carrier aggregation may be used for both uplink (UL) and/or downlink (DL) transmissions, Carrier aggregation may be implemented with one or more of the following modes: intra-band frequency aggregation with contiguous CCs; intra-band frequency aggregation with non-contiguous CCs; and/or inter-band frequency aggregation with non-contiguous CCs. In some embodiments, the categorization of CA modes may be dependent on a collection of bands containing the CCs which may be referred to as a band combination.

Carrier aggregation techniques may also be implemented in dual connectivity (DC) systems. Thus, any of the principles disclosed herein in the context of CA deployment scenarios may also be applied to DC deployment scenarios.

Dual connectivity systems may provide higher per-user throughput by offloading data transfers from a master node to a secondary node, for example, if the master node becomes overloaded. An example use case of DC may be offloading data from a macro cell to a small cell. In some embodiments of DC, a UE may first connect to a master node then to a secondary node. Some examples of DC scenarios may include EN-DC, NE-DC and NN-DC in which the master node and secondary nodes may be implemented as (eNB, gNB), (gNB, eNB) and (gNB, gNB), respectively, where eNB may refer to an eNodeB, and gNB may refer to a gNodeB. Nodes such as eNB and gNB may also be referred to as base stations. Deployment scenarios where the nodes are of different radio access technologies may be referred to as multi-radio access technology (Multi-RAT or MR) dual connectivity (MR-DC). Examples of MR-DC may include NR-E-UTRA dual connectivity (NE-DC) where E-UTRA may refer to Evolved Universal Terrestrial Radio Access, E-UTRA Radio dual connectivity (EN-DC), and NR dual connectivity (NN-DC).

FIG. 1 illustrates an example embodiment of an NN-DC deployment in accordance with the disclosure. In the embodiment illustrated in FIG. 1, UE-3 may be simultaneously connected to two NR nodes (e.g., gNBs), The master gNB (MgNB) may configure a set of serving cells within a master cell group (MCG) and the secondary gNB (SgNB) may configure a set of serving cells within a secondary cell group (SCG). The primary cell of the MCG may be referred to as a PCell while the secondary cells of the MCG may be referred to as SCells. The primary cell of the SCG may be referred to as a PSCell. The PCell and PSCells may also be referred to as special cells (SpCells).

Cross-Carrier Scheduling

When using aggregated carriers, control information for scheduling a data transfer may be sent on the same CC that transfers the data. This may be referred to as self-scheduling. Alternatively, a data transfer on one CC may be scheduled by control information sent on a different CC. This may be referred to as cross-carrier scheduling (CCS). A cell that schedules another cell may be referred to as a scheduling cell. A cell that is scheduled by another cell may be referred to as a scheduled cell.

In some embodiments of wireless networks, a UE may receive downlink control information (DCI) from a base station (e.g., a gNB) in a physical downlink control channel (PDCCH). The DCI may include scheduling information for a physical downlink shared channel (PDSCH) and/or a physical uplink shared channel (PUSCH). A physical uplink control channel (PUCCH) may include various information such as hybrid automatic repeat request acknowledgments (HARQ-ACKs) that may be used to implement error correction of data sent on PDSCHs. The DCI may also include scheduling information for PUCCHs that include acknowledgments for the PDSCHs scheduled by the DCI. Thus, in some embodiments, the shared channels (PDSCH and PUSCH) may generally transfer data, while the control channels (PDCCH and PUCCH) may generally provide control signaling for the shared channels.

In a wireless network that implements carrier aggregation, some cells may be configured for self-scheduling such that the PDCCH that that schedules a PDSCH and/or a PUSCH on a cell is transmitted on the same cell. Some cells, however, may be configured for cross-carrier scheduling such that a PDCCH transmitted on a first cell may schedule one or more PDSCHs and/or PUSCHs on one or more other cells.

For purposes of illustration, a scheduling cell may have a numerology $\mu_1$ and a scheduled cell may have a numerology $\mu_2$. In some embodiments, cross-carrier scheduling may be performed by a scheduling cell having the same numerology as the scheduled cell ($\mu_1=\mu_2$) or a different numerology from the scheduled cell ($\mu_1 \neq \mu_2$).

Figure 2:
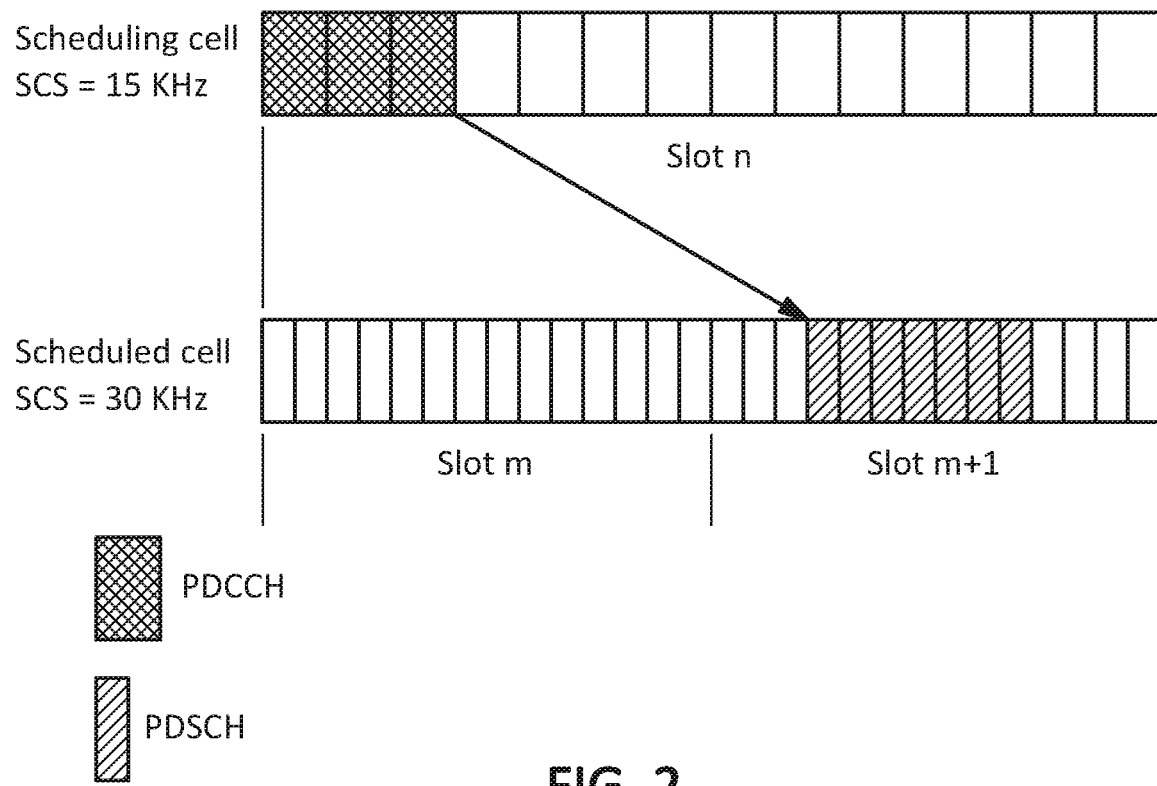
FIG. 2 illustrates an example embodiment of cross-carrier scheduling with cells having different numerologies in accordance with the disclosure.

FIG. 2 illustrates an example embodiment of cross-carrier scheduling with cells having different numerologies in accordance with the disclosure. In the example illustrated in FIG. 2, the scheduling cell has a subcarrier spacing (SCS) of 15 KHz, and the scheduled cell has an SCS of 30 KHz. A PDCCH may be transmitted on the first three symbols of slot n of the scheduling cell which schedules a PDSCH on slot m+1 of the scheduled cell.

In some embodiments, cross-carrier scheduling of cells with different numerologies ($\mu_1 \neq \mu_2$) may facilitate using a cell in frequency range 1 (FR1) to schedule a cell in FR2. For example, in some embodiments, cells in FR1 (e.g., below 6 GHz) may provide better coverage and/or may be more reliable for delivering downlink control information. Thus, cross-carrier scheduling may be an effective technique for using cells in FR1 to deliver delivering DL control information for FR2 on FR1.

Search Space Monitoring

In some embodiments, monitoring of DCI to decode PDCCH may be performed on a search space (SS) of a scheduling cell. A search space may be implemented, for example, as a common SS (CSS) and/or a UE-specific SS (USS). In some embodiments, search spaces may be implemented as different types of search spaces as described in Appendix 1 which may be based, for example, on Technical Specification TS 38.213 by the 3rd Generation Partnership Project (3GPP). In some embodiments, CSS (except for type3 group common (GC) PDCCH SS) may be monitored only on primary cells whereas USS and type3 CSS may be monitored in all cells. In some embodiments, where cross-carrier scheduling is used, no SS may be monitored on a scheduled cell.

UE Processing Times

In some embodiments, the processing by a UE of DCI to receive PDSCH or DCI to transmit PUSCH may be subject to a processing time. In some embodiments, UE may have two different processing capabilities which may be referred to as capability 1 (cap#1) and capability 2 (cap#2). In some embodiments, the capability may be determined in terms of the number of OFDM symbols (e.g., N1 or N2) a UE may use to process PDSCH or PUSCH. These processing capabilities depend, for example, on various parameters including a subcarrier spacing (SCS), numerology, and/or the like. In some embodiments, N1 or N2 may be smaller for cap#2 (shortened processing time) than for cap#1. Some example embodiments of UE processing capabilities are described in Appendix 2 which may be based, for example, on Technical Specification TS 38.213 by the 3GPP.

Dynamic Spectrum Sharing

Dynamic spectrum sharing (DSS) is a technique in which spectrum space may be dynamically shared by different types of networks. For example, DSS may enable 4G long-term evolution (LTE) devices (e.g., UEs and eNBs) to operate in the same frequency bands and/or channels as 5G NR devices (e.g., UEs. and gNBs). Because the time required to completely refarm 4G frequency bands to 5G frequency bands may delay the deployment of 5G NR systems, DSS may enable 5G NR systems to be deployed while 4G LTE systems are still in operation.

In some embodiments, DSS may exploit the fact that 4G LTE and 5G NR systems are both based on OFDM technology. Thus, available resources may be dynamically shared between 4G and 5G users. In some embodiments, DSS may be deployed at relatively low frequencies (e.g., below 6 GHz) which may tend to provide better coverage for 5G systems.

In wireless networks that use carrier aggregation, primary cells may be deployed at lower frequencies because of the better coverage lower frequencies may provide. Thus, primary cells may be used in the shared frequency bands of DSS deployments. However, in DSS deployments, 4G and 5G systems may both use the same frequency resources, and therefore, the shared frequency bands and/or channels may become crowded and cause bottlenecks that may reduce bandwidth and/or increase latency for both 4G and 5G systems. Thus, there is a motivation to reduce or eliminate any sources of overhead in the cells that share spectrum space in DSS systems.

Figure 3:
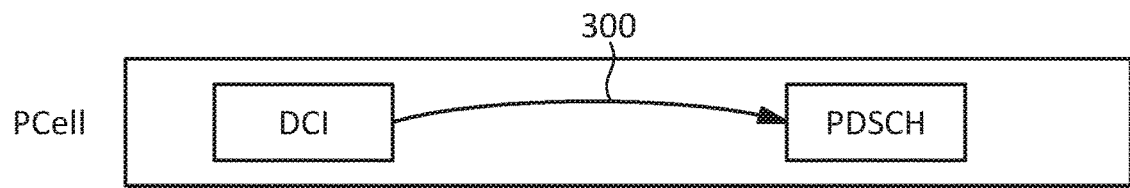
FIG. 3 illustrates an example embodiment of a scheduling operation in which a primary cell is self-scheduling in accordance with the disclosure.

FIG. 3 illustrates an example embodiment of a scheduling operation in which a primary cell (PCell) is self-scheduling in accordance with the disclosure. In the embodiment illustrated in FIG. 3, time may be represented in the horizontal direction (with time progressing from left to right) and frequency (spectrum space) may be represented in the vertical direction. Because it is self-scheduled the primary cell (PCell) may receive a PDCCH including a DCI which may schedule a PDSCH in the PCell as shown by the arrow 300. Thus, the time (horizontal space) taken up by the PDCCH represents resources on the primary cell that may not be used by other devices, processes, and/or the like.

Primary Cell Scheduled By a Secondary Cell

Figure 4:
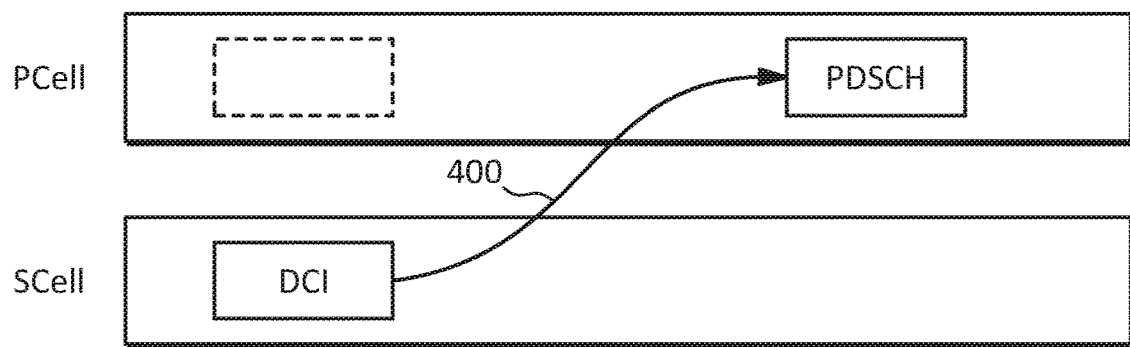
FIG. 4 illustrates an example embodiment of a cross-carrier scheduling operation in which a primary cell is scheduled by a secondary cell in accordance with the disclosure.

FIG. 4 illustrates an example embodiment of a cross-carrier scheduling operation in which a primary cell (PCell) is scheduled by a secondary cell (SCell) in accordance with the disclosure. As shown in FIG. 4, the PDSCH on the primary cell may be scheduled by a DCI in the PDCCH on the secondary cell. Thus, the PDCCH used by the primary cell in FIG. 4 (shown by the dashed lines) may be available for use by other devices, processes, and/or the like on the primary cell. In some embodiments, moving the scheduling PDCCH to the secondary cell may be facilitated by the fact that, some or all of the information transmitted in a PDCCH may not need to be transmitted on a primary cell.

In some embodiments, the cross-carrier scheduling operation in FIG. 4 may be used in a DSS system in which the primary cell may operate in a relatively crowded shared 4G/5G frequency space. In such an embodiment, the PDCCH may be relocated to the secondary cell which may operate in a relatively uncrowded dedicated 5G frequency space. Depending on the implementation details, this may reduce the scheduling overhead of the primary cell, thereby reducing crowding on the primary cell.

In some embodiments of CCS procedures, PDCCH may not be monitored in a scheduled cell. Thus, no PDCCH may be monitored on the primary cell if it is configured as a scheduled cell in CCS. However, a primary cell may be used to obtain broadcast and/or system information that may be used during an initial access procedure and/or to support random access procedures. In some embodiments, this broadcast and/or system information may only be available by monitoring a CSS for the primary cell. Moreover, because other UEs in the network may still need to access the broadcast and/or system information, the CSS through which the broadcast and/or system information is provided for the primary cell may still be available on the network.

In some embodiments in accordance with the disclosure, a UE may monitor a CSS for a primary cell if the primary cell is configured as a scheduled cell. For example, a UE may monitor a CSS for a scheduled primary cell to obtain broadcast and/or system information that may be used during an initial access procedure and/or to support random access procedures.

In some embodiments in accordance with the disclosure, a UE that monitors a CSS for a scheduled primary cell may exclude certain types of CSS such as type-3 CSS (e.g., CSS that may be decoded using cell-radio network temporary identifier (C-RNTI)). For example, in some embodiments, a UE may monitor DCI for unicast communications by decoding the CSS using C-RNTI. However unicast communications may not be relevant to acquiring broadcast and/or system information for initial access and/or random access procedures. Therefore, as a refinement to monitoring a CSS for a scheduled primary cell, in some embodiments in accordance with the disclosure, a UE may not monitor a CSS of a primary cell using C-RNTI.

Overbooking

Monitoring PDCCH may require a UE to perform blind decoding of PDCCH candidates that may or may not contain valid DCI. This may place a relatively large processing burden on the UE. To limit or reduce this burden, some networks may use one or more techniques to limit the amount of processing a UE may perform on decoding. For example, in some embodiments, a network may include no more than a fixed number of PDCCH candidates that a UE may be expected to decode per slot. However, implementing this type of blind decoding limit may place a processing burden on the network (e.g., on a gNB). Therefore, in some embodiments, a network may allow overbooking in search spaces which may be configured with more PDCCH candidates than a UE may be expected to decode. However, to limit the processing burden on the UE, the UE may only be expected to monitor the search space for a limited number of PDCCH candidates by selecting certain possible candidates. These selected candidates may be coordinated with the network through a set of selection rules that may ensure that the UE and the network have the same understanding of which candidates are selected. The UE may drop the PDCCH candidates and/or search spaces that are not seleqted. Example embodiments of such selection rules are described in Appendix 3 which may be based, for example, on Technical Specification TS 38.213 by 3GPP.

In some embodiments, such selection rules may only be applied to allow overbooking of primary cells. The network may still implement a blind decoding limit on PDCCH candidates for secondary cells because the burden on the network to enforce a limit for secondary cells may be substantially less than the burden for primary cells. Thus, in some embodiments, a UE may perform a selection procedure to limit the number of blind decoding candidates in search spaces of primary cells, but the UE may assume that it should decode all candidates in search spaces of secondary cells because the network will limit the number of candidates.

However, allowing secondary cells to schedule primary cells for CCS may increase the load on the secondary cells. For example, referring to FIG. 3, because the secondary cell may schedule the primary cell, it may include an additional PDCCH to obtain the DCI to schedule the primary cell. This, in turn, may increase the burden on the network to implement a blind decoding limit for secondary cells.

In some embodiments in accordance with the disclosure, overbooking may be allowed on secondary cells that schedule other cells, for example, primary cells. Depending on the implementation details, this may reduce or eliminate the burden on a network to implement a blind decoding limit for secondary cells.

In some embodiments, the network may still implement a blind decoding limit for secondary cells that do not schedule other cells such as primary cells. In such embodiments, a UE may not expect a number of PDCCH candidates, and/or a number of corresponding non-overlapping control channel elements (CCEs) per slot on a secondary cell to be larger than the corresponding numbers that the UE is capable of monitoring on the secondary cell per slot, except for a secondary cell that schedules a primary cell.

In some embodiments, when overbooking is allowed on secondary cells that schedule other cells, a set of selection rules similar to those for overbooking of primary cells may be applied to overbooking of secondary cells.

In some embodiments, when overbooking is allowed on scheduling secondary cells, overbooking may or may not be allowed on primary cells. For example, if overbooking is allowed on secondary cells that schedule primary cells for CCS, this may result in multiple secondary cells being overbooked. However, in some embodiments, a UE may use the same parallel processing resources for primary cells and secondary cells, so additional overbooking on secondary cells may affect the amount for processing resources available for overbooking on primary cells. Thus, the processing burden from overbooking on secondary cells may be considered jointly with the processing burden from overbooking on primary cells.

In some embodiments, when overbooking is allowed on secondary cells that schedule other cells, overbooking may not be allowed on primary cells that are scheduled by secondary cells. Depending on the implementation details, this may counteract the increased processing burden on secondary cells that are allowed to be overbooked because they are scheduling cells.

Thus, in some embodiments, a UE may not expect a number of PDCCH candidates, and/or a number of corresponding non-overlapped CCEs per slot on a primary cell to be larger than the corresponding numbers that the UE is capable of monitoring on the primary cell per slot if the primary cell is a scheduled cell in CCS (or if the primary cell does not have a UE specific search space (USS)).

In some embodiments, OSS for broadcast and/or system information for initial access and/or random access may remain in a scheduled primary cell, for example, because it may be used for other purposes within the network. However, from the perspective of a UE, such CSS may not necessarily need to remain on a scheduled primary cell. Hence, in some embodiments, PDCCH may not be monitored on a primary cell. A secondary cell overbooking scheme as described above may be applied. Thus, overbooking may be allowed on a secondary cell that schedules a primary cell, and the scheduling secondary cell may contain CSS. In some embodiments, a secondary cell containing CSS may be different from a secondary cell that schedules a primary cell, and overbooking may be allowed one or both of the types of secondary cells.

In some embodiments, a potential motivation for allowing overbooking on a primary cell and having a UE perform a selection procedure is that CSS except for type-3 CSS may only be monitored only on a primary cell, which may cause the primary cell to become more crowded. However, if C-RNTI is not monitored on a primary cell, then such motivation may not apply, and thus, overbooking may be allowed on secondary cells that schedule primary cells.

Secondary Cell Deactivation

In some embodiments, CCS configuration may be performed by radio resource control (RRC) signaling, whereas secondary cell activation and/or deactivation may be performed by a medium access control (MAC) control element (MAC-CE). In some embodiments, a MAC-CE may be used for secondary cell activation because it may provide faster secondary cell activation and/or deactivation than RRC reconfiguration. An example embodiment of a procedure for deactivating a secondary cell is described in Appendix 4 which may be based, for example, on Technical Specification TS 38.213 by the 3GPP.

In some embodiments, the configuration of a secondary cell that schedules a primary cell may be performed by RRC signaling. However, if the network decides to deactivate the secondary cell using MAC-CE before a new scheduling configuration is provided by RRC, the primary cell may be left in a state without scheduling.

In some embodiments in accordance with the disclosure, one or more techniques may be used to prevent the deactivation of a scheduling secondary cell from interfering with the operation of a primary cell that is scheduled by the secondary cell. For example, in some embodiments, the network may ensure that a secondary cell that schedules a primary cell may not be deactivated. The secondary cell may be deactivated after RRC reconfigures the primary cell to be scheduled by another secondary cell. This may be accomplished, for example, by coordinating the MAC-CE with the RRC.

As another example, in some embodiments, a MAC-CE may be configured to change the CCS configuration of the primary cell such that a different secondary cell schedules the primary cell before the secondary cell is deactivated. Alternatively, or additionally, the MAC-CE may be configured to change the CCS configuration of the primary cell to self-scheduling. In this example, a search space may be configured for the primary cell, e.g., using search space configuration information contained in the MAC-CE.

As a further example, the primary cell may be configured to automatically become self-scheduled if the scheduling secondary cell is deactivated. In this example, if a CSS is already monitored in the primary cell, the UE may continue to use the CSS for the primary cell. If the CSS that was already being monitored was not being monitored with C-RNTI, the UE may begin monitoring the CSS with C-RNTI when the scheduling secondary cell is deactivated.

As yet another example, the RRC may configure another secondary cell as a default cell that may begin scheduling the primary cell if the secondary cell currently scheduling the primary cell is deactivated. This may be implemented, for example, by the RRC providing the UE a list of secondary cells that may be used as a fallback for scheduling a primary cell if a scheduling secondary cell is deactivated.

DCI Scheduling Multiple Cells

Another approach to reducing overhead on crowded primary cells may be to allow a single DCI to schedule transport blocks (TBs) in multiple cells using carrier aggregation. For example, in some embodiments, a baseline scheme for multi-CC scheduling by a DCI may involve allowing a DCI to schedule one TB corresponding to PDSCH or PUSCH for each of multiple scheduled cells. In some embodiments, the baseline scheme may be enhanced, for example, by allowing a single DCI to schedule multiple TBs for one or more of the multiple cells.

Figure 5:
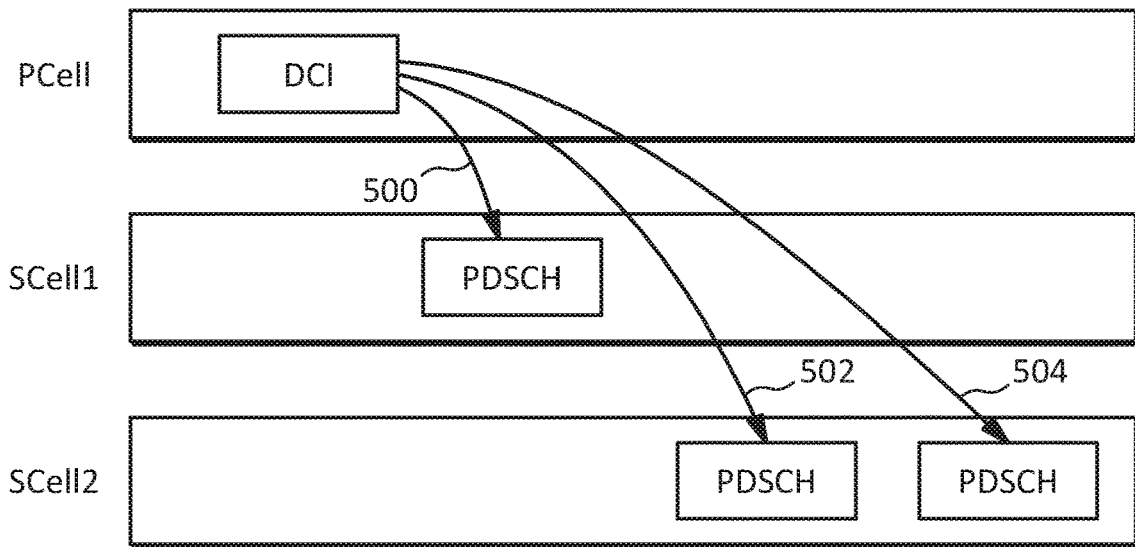
FIG. 5 illustrates an example embodiment of a cross-carrier scheduling operation in which a single DCI schedules multiple cells in accordance with the disclosure.

FIG. 5 illustrates an example embodiment of a cross-carrier scheduling operation in which a single DCI schedules multiple cells in accordance with the disclosure. As shown in FIG. 5, a single DCI in a PDCCH on a primary cell (PCell) may schedule a PDSCH on a first secondary cell (SCell1) as shown by arrow 500. The DCI may also schedule two PDSCHs on a second secondary cell (SCell2) as shown by arrows 502 and 504.

In some embodiments in which a DCI schedules multiple cells, one or more parameters in the DCI related to such allocation may be duplicated to provide multiple copies. Some examples of such allocation parameters may include time domain resource allocation (TDRA), frequency domain resource allocation (FDRA), redundancy version (RV), modulation and coding scheme (MCS), PDCCH-to-PDSCH timing parameter K0, PDSCH-to-PUCCH timing parameter K1, PDCCH-to-PUSCH timing parameter K2, downlink assignment index (DAI), and/or the like.

In some embodiments, such duplication may increase the size of the DCI and/or degrade efficiency. Alternatively, or additionally, RRC may provide a list of allocation parameters and/or groups of allocation parameters for all cells, and the DCI may provide an index into the list. Alternatively, or additionally, one or more parameters may be shared by multiple cells. Depending on the implementation details, these alternative/additional techniques may reduce the size and/or improve the efficiency of the DCI.

The use of a single DCI to schedule multiple cells may affect the handling of the PDSCH-to-PUCCH timing parameter K1 and PUCCH resource indicator (PRI), especially when multiple cells belong to the same PUCCH group. In some embodiments in which multiple cells belong to the same PUCCH group, it may be beneficial to use a single PUCCH. In some embodiments, a single parameter for K1 and a single parameter for the PRI may be provided, and the actual PUCCH may be determined based on the latest PUCCH among hypothetically constructed PUCCHs corresponding to the PDSCH numerology and/or allocation parameter for each cell. In some other embodiments, a single parameter for K1 and a single parameter for the PRI may be provided, and the actual PUCCH may be determined based on the earliest PUCCH satisfying a PDSCH processing time for all cells among hypothetically constructed PUCCHs corresponding to the PDSCH numerology and/or allocation parameter of each cell. In some other embodiments, one or more PDSCH cells may be used as a reference cell to determine the actual PUCCH.

PUCCH for Acknowledgments

In some embodiments in which a DCI schedules multiple cells, one PUCCH resource may be used to transmit the acknowledgments (e.g., HARQ-ACK bits) for the PDSCHs scheduled by the DCI. In some other embodiments, multiple PUCCH resources may be used to transmit the acknowledgments for the PDSCHs scheduled by a DCI. The following are example embodiments, including some alternatives, of techniques for determining the PUCCH resources in accordance with the disclosure. In these examples, a PDCCH on a scheduling cell may schedule N PDSCHs on N serving cells. Individual acknowledgment bits may also be referred to as ACK/NACK or A/N bits. Example 1 may provide some techniques for using a single PUCCH resource. Example 2 may provide some techniques for using multiple PUCCH resources.

Example 1 (using One PUCCH)

Alternative 1.1 (Single field for TDRA, K1, and PRI): One field may be used for all N cells. The field may include TDRA, PDSCH-to-HARQ . . . feedback timing indicator K1, and PRI.

Sub-Alternative 1.1-1: The network may ensure that applying the single field for all cells indicates the same PUCCH slot. The PUCCH resource may be determined according to the PRI field. For example, the network may configure the N cells to have the same SCS numerology.

Sub-Alternative 1.1-2: N possibly different PUCCH slots and PUCCH resources may be determined according to the single DCI field. The UE may then select a single PUCCH slot and resource from the N slots and resources according to one or more of the following: (1) a reference cell may be used to obtain the PUCCH slot and resource; (2) the UE may select the PUCCH slot and resource as the earliest PUCCH resource that satisfies the PDSCH processing time of all the cells; and/or (3) the UE may select the PUCCH slot and resource as the latest PUCCH resource among the N PUCCH slots and PUCCH resources.

Alternative 1,2 (N fields for TDRA, K1, and PRI): N different fields may be used for TDRA, PDSCH-to-HARQ_feedback timing indicator K1, and PRI for the N cells. The network may ensure that applying the N fields for all cells indicate the same PUCCH slot. In this case, the PUCCH resource may be determined according to the PRI field corresponding to the serving cell with the largest or smallest cell index among the N cells.

Alternative 1.3 (N fields for TDRA, K1, and 1 field for PRI): N different fields may be used for TDRA and the PDSCH-to-HARQ_feedback timing indicator K1 for the N cells. The network may ensure that applying the N fields for all cells indicate the same PUCCH slot. The PUCCH resource may be determined according to the single PRI field.

Example 2 (using Multiple PUCCHs)

Alternative 2.1 (Single field for TDRA, K1, and PRI): One field may be used for TDRA, PDSCH-to-HARQ_feedback timing indicator K1, and the PRI for all N cells. N possibly different PUCCH slots and PUCCH resources may be determined according to the single DCI field for the N cells. PUCCH resource overriding may only be applied for the serving cells with the same PUCCH slot. The actual number M of PUCCH transmissions may be less than N because some of the fields may indicate the same PUCCH slot.

Alternative 2.2 (N fields for TDRA, K1, and PRI): N different fields may be used for TDRA, PDSCH-to-HARQ_feedback timing indicator K1, and the PRI for the N cells. N possibly different PUCCH slots and PUCCH resources may be determined according to the N DCI fields for the N cells. PUCCH resource overriding may only be applied for the serving cells with the same PUCCH slot. The actual number M of PUCCH transmissions may be less than N because some of the fields may indicate the same PUCCH slot.

Codebook Construction

In some embodiments in which a single DCI may be used to schedule multiple cells, multiple PUCCHs may be used to transmit the acknowledgments for the PDSCHs scheduled by a DCI. For example, a single parameter for K1 and a single parameter for PRI may be utilized, and multiple PUCCHs may be constructed based on the single parameters. In some embodiments, multiple DAI fields may be used since a DAI may relate to one reference PUCCH slot.

In some embodiments in which a single DCI schedules multiple cells, a single PUCCH may be used to transmit the acknowledgments for the PDCCHs scheduled by a DCI. When using a single PUCCH, one or multiple DAI fields may be provided. If only one DAI field is provided, a procedure of constructing an acknowledgment codebook (e.g., a type-2 HARQ-ACK codebook) may be implemented in a manner that may accommodate the presence of only one DAI field. For example, a codebook construction procedure such as that provided in TS 38.213 by 3GPP may be modified such that an A/N bit location in the codebook may be generated as "N" consecutive positions where the starting position may correspond to the position of the lowest scheduled cell index, where "N" may be the number of scheduled cells in DCI. In this case, a DAI related operation in the codebook may be skipped for all other scheduled cell indices, and a DAI increment of one may be used by this DCI. An example embodiment of a codebook construction algorithm is described in Appendix 5 which may be based, for example, on Technical Specification TS 38.213 by the 3GPP.

Figure 6:
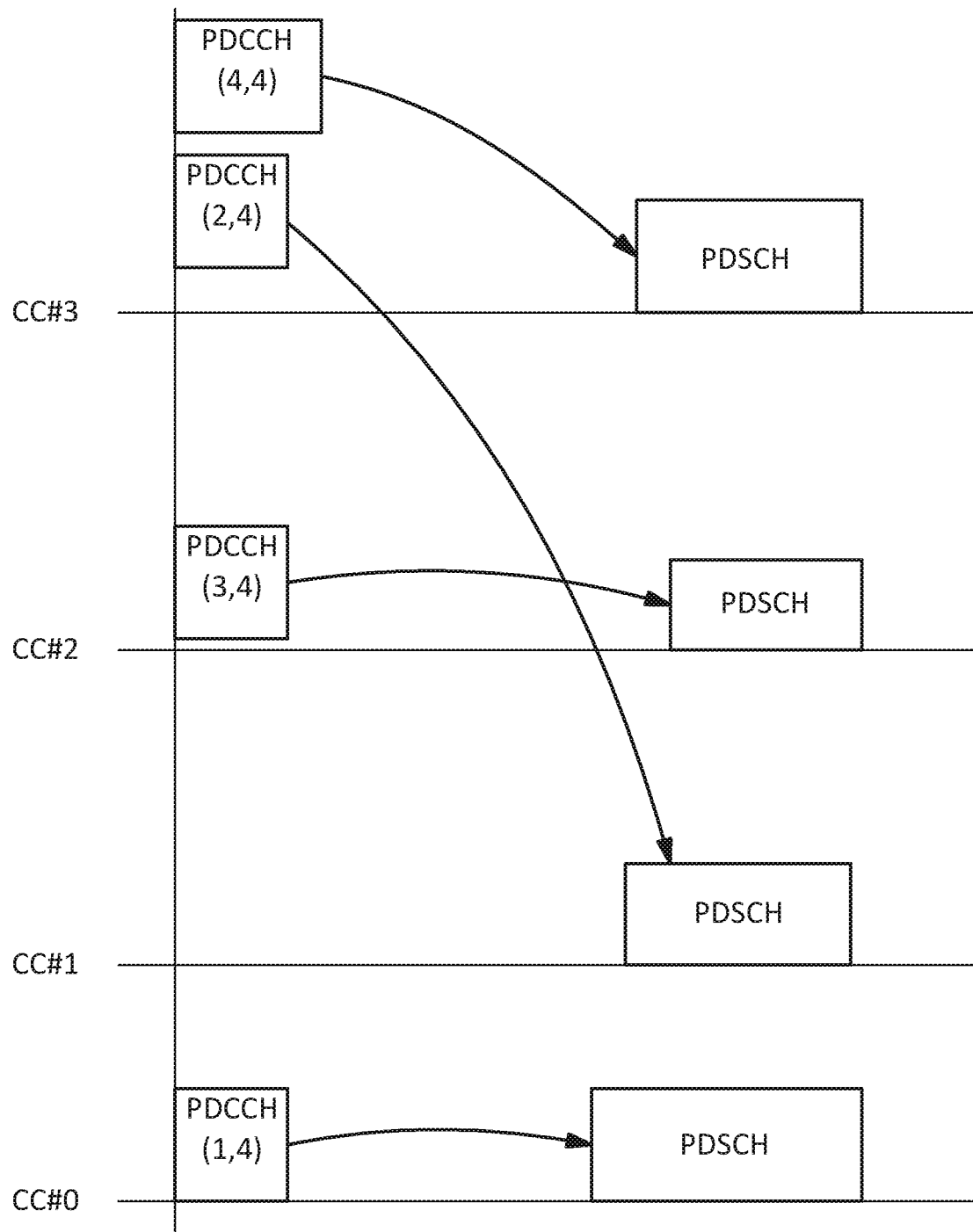
FIG. 6 illustrates an example embodiment of a cross-carrier scheduling method using multiple DAI fields in accordance with the disclosure.

FIG. 6 illustrates an example embodiment of a cross-carrier scheduling method using multiple DAI fields in accordance with the disclosure. The PDSCH on CC#0 may be scheduled by the PDCCH on CC#0 having a DAI field (1,4) in which the DAI field may include a (C-DAI,T-DAI) pair. The PDSCH on CC#1 may be scheduled by one of the PDCCHs on CC#3 having a DAI field (2,4). The PDSCH on CC#2 may be scheduled by the PDCCH on CC#2 having a DAI field (3,4). The PDSCH on CC#4 may be scheduled by the other PDCCH on CC#4 having a DAI field (4,4). In the embodiment illustrated in FIG. 6, one PUCCH slot may be assumed as each DAI field may be with respect to one PUCCH slot. The embodiment illustrated in FIG. 6 may use "N" DAI fields to construct a Type-2 codebook. The UE may treat the detected DCI as N detected DCI, each with corresponding DAI fields.

The following DAI definition may be used: a value of the counter downlink assignment indicator (DAI) field in DCI formats denotes the accumulative number of {serving cell, PDCCH monitoring occasion}-pair(s) in which PDSCH reception(s) or SPS PDSCH release associated with the DCI formats is present up to the current serving cell and current PDCCH monitoring occasion, first in ascending order of serving cell index and then in ascending order of PDCCH monitoring occasion index m, where $0 \leq m < M$, and where the serving cell may refer to the scheduled cell.

However, in some embodiments in accordance with the disclosure, if only one DAI field is present in the scheduling DCI, the DAI field may be redefined. For example, referring to FIG. 6, if a single DCI replaces the two DCIS in CC#3 scheduling the PDSCHs CC#1 and CC#3, it may be difficult to determine the value to use for the single C-DAI in the POOCH on CC#3. If C-DAI is to provide the accumulative number of {serving cell, PDCCH monitoring occasion}-pair(s) up to CC#1, the value may be 2. However, if C-DAI is to provide the accumulative number up to CC#3, the value may be 4. In some embodiments with a codebook construction algorithm in accordance with the disclosure, either value may work properly in terms of the HARQ-ACK payload size determination as described below.

Figure 7:
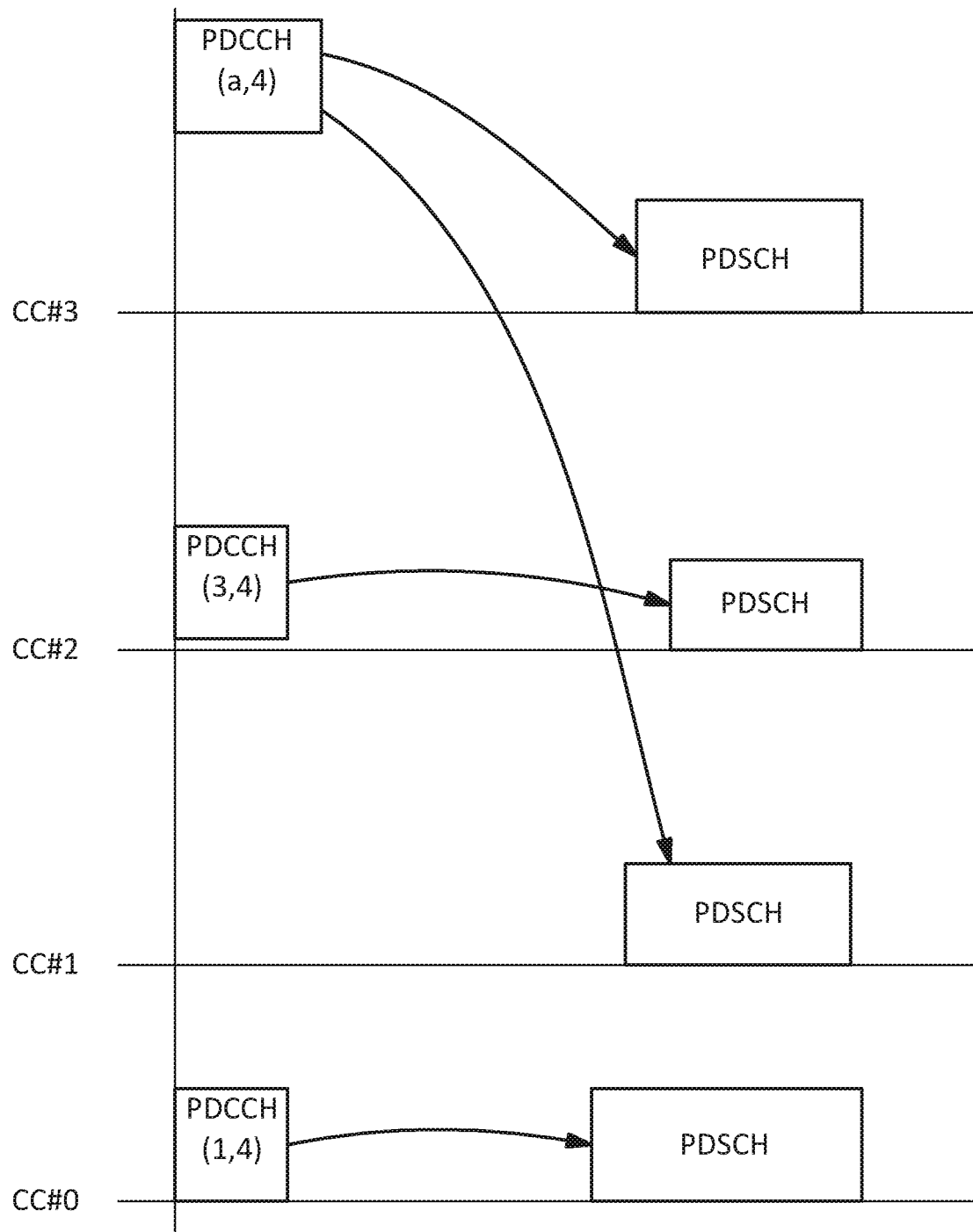
FIG. 7 illustrates an example embodiment of a cross-carrier scheduling method using a single DAI field in accordance with the disclosure.

FIG. 7 illustrates an example embodiment of a cross-carrier scheduling method using a single DAI field in accordance with the disclosure. The method illustrated in FIG. 7 may be similar to that illustrated in FIG. 6, however, the two DCIs in CC#3 scheduling the PDSCHs CC#1 and CC#3 shown in FIG. 6 may be replaced by a single DCI as shown in FIG. 7.

Some embodiments may construct a codebook according to the following method. For a PDCCCH scheduling N different cells, a single field for (C-DAI,T-DAI) may be present in the DCI. The value of C-DAI on a PDCCH scheduling serving cells with indices $i_1, i_2, \ldots, i_N$ may denote the accumulative number of {serving cell, PDCCCH monitoring occasion}-pairs in which PDSCH reception or semi-persistent scheduling (SPS) PDSCH release associated with a DCI format up to the current serving cell and current PDCCH monitoring occasion, first in ascending order of serving cell index and then in ascending order of PDCCH monitoring occasion index m, where $0 \leq m < M$, where the current serving cell is the serving cell with largest or smallest index among $i_1, \ldots, i_N$. This may be the C-DAI is associated with the cell index $c'=\max(i_1, \ldots, i_N)$ or $c'=i_1, \ldots, i_N)$. In some embodiments, the value of T-DAI may be determined, for example, using the definition provided by Release 15 or Release 16 of the 3GPP standards. In some embodiments, the codebook operation may be implemented in a manner similar to that described in Appendix 5, however with the following modifications: (a) in the "while $c<N_{cells}^{DL}$" loop all the cell indices in the set $\{i_1, \ldots, i_N\}\backslash c'$ may be skipped (which may also be referred to as being reserved); (a) the NACK values used for the skipped indices may not be included; and (c) for the valid A/N bits for the skipped indices, positions in the codebook may be replaced by the original positions of NACK values or the new positions consecutively following the A/N value of the largest or smallest index.

Applying the method described above to the example illustrated in FIG. 7, if c'=max(1,3)=3, a=4, and cell index c=1 in the while loop may be skipped. By skipping cell index c=1, a NACK value may be generated for the PDSCH on CC#1. With the modifications (a), (b), and/or (c) described above, the NACK bit may be replaced by a valid A/N bit for the PDSCH on CC#1. If c'=min (1,3)=1, a=2, and cell index c=3 may be skipped. By skipping cell index c=1, a NACK value may be generated for the PDSCH on CC#3. With the modifications (a), (b), and/or (c) described above, the NACK bit may be replaced by a valid A/N bit for the PDSCH on CC#3.

User Equipment

Figure 8:
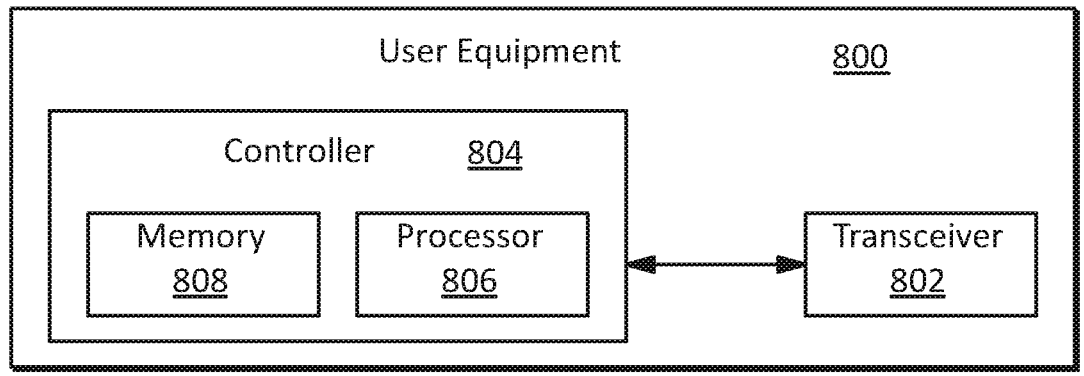
FIG. 8 illustrates an example embodiment of a user equipment (UE) in accordance with the disclosure.

FIG. 8 illustrates an example embodiment of a user equipment (UE) in accordance with the disclosure. The embodiment 800 illustrated in FIG. 8 may include a radio transceiver 802 and a controller 804 which may control the operation of the transceiver 802 and/or any other components in the UE 800. The UE 800 may be used, for example, to implement any of the functionality described in this disclosure. The transceiver 802 may transmit/receive one or more signals to/from a base station, and may include an interface unit for such transmissions/receptions. The controller 804 may include, for example, one or more processors 806 and a memory 808 which may store instructions for the one or more processors 806 to execute code to implement any of the functionality described in this disclosure. For example, the UE 800 and/or the controller 804 may be used to implement functionality relating to monitoring CSS in a primary cell that may be scheduled by a secondary cell, overbooking of a secondary cell that schedules a primary cell, determining PUCCH resources for multiple cells scheduled by a single DCI, constructing a codebook for multiple cells scheduled by a single DCI, and/or the like.

Base Station

Figure 9:
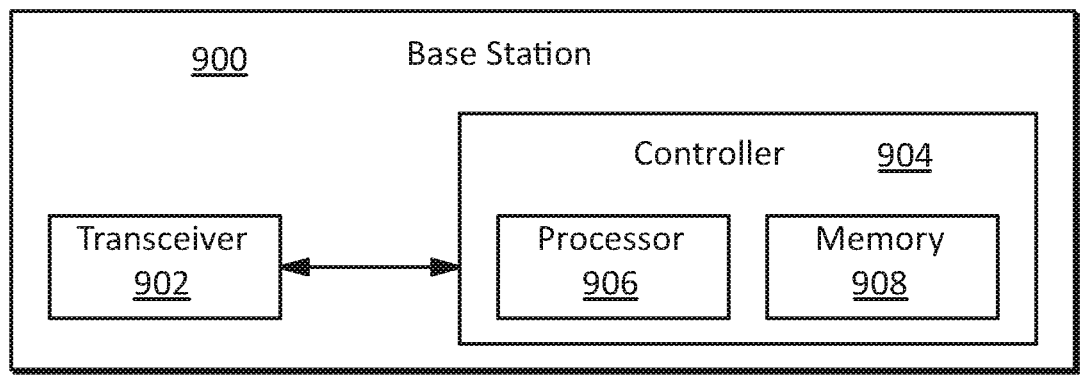
FIG. 9 illustrates an example embodiment of a base station in accordance with the disclosure.

FIG. 9 illustrates an example embodiment of a base station in accordance with the disclosure. The embodiment 900 illustrated in FIG. 9 may include a radio transceiver 902 and a controller 904 which may control the operation of the transceiver 902 and/or any other components in the base station 900. The base station 900 may be used, for example, to implement any of the functionality described in this disclosure. The transceiver 902 may transmit/receive one or more signals to/from a user equipment, and may include an interface unit for such transmissions/receptions. The controller 904 may include, for example, one or more processors 906 and a memory 908 which may store instructions for the one or more processors 906 to execute code to implement any of the base station functionality described in this disclosure. For example, the base station 900 and/or the controller 904 may be used to implement functionality relating to overbooking of secondary cells that may schedule primary cells, coordinating the deactivation of a secondary cell that may schedule a primary cell, and/or the like.

In the embodiments illustrated in FIGS. 8 and 9, the transceivers 802 and 902 may be implemented with various components to receive and/or transmit RF signals such as amplifiers, filters, modulators and/or demodulators, A/D and/or DA converters, antennas, switches, phase shifters, detectors, couplers, conductors, transmission lines, and/or the like. The controllers 804 and 904 may be implemented with hardware, software, and/or any combination thereof. For example, full or partial hardware implementations may include combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), application specific integrated circuits (ASICs), systems on chip (SOC), state machines, data converters such as ADCs and DACs, and/or the like. Full or partial software implementations may include one or more processor cores, memories, program and/or data storage, and/or the like, which may be located locally and/or remotely, and which may be programmed to execute instructions to perform one or more functions of the controllers. Some embodiments may include one or more CPUs such as complex instruction set computer (CISC) processors such as x86 processors and/or reduced instruction set computer (RISC) processors such as ARM processors, and/or the like, executing instructions stored in any type of memory, graphics processing units (GPUs), neural processing units (NPUs), tensor processing units (TPUs), and/or the like.

Additional Embodiments

Figure 10:
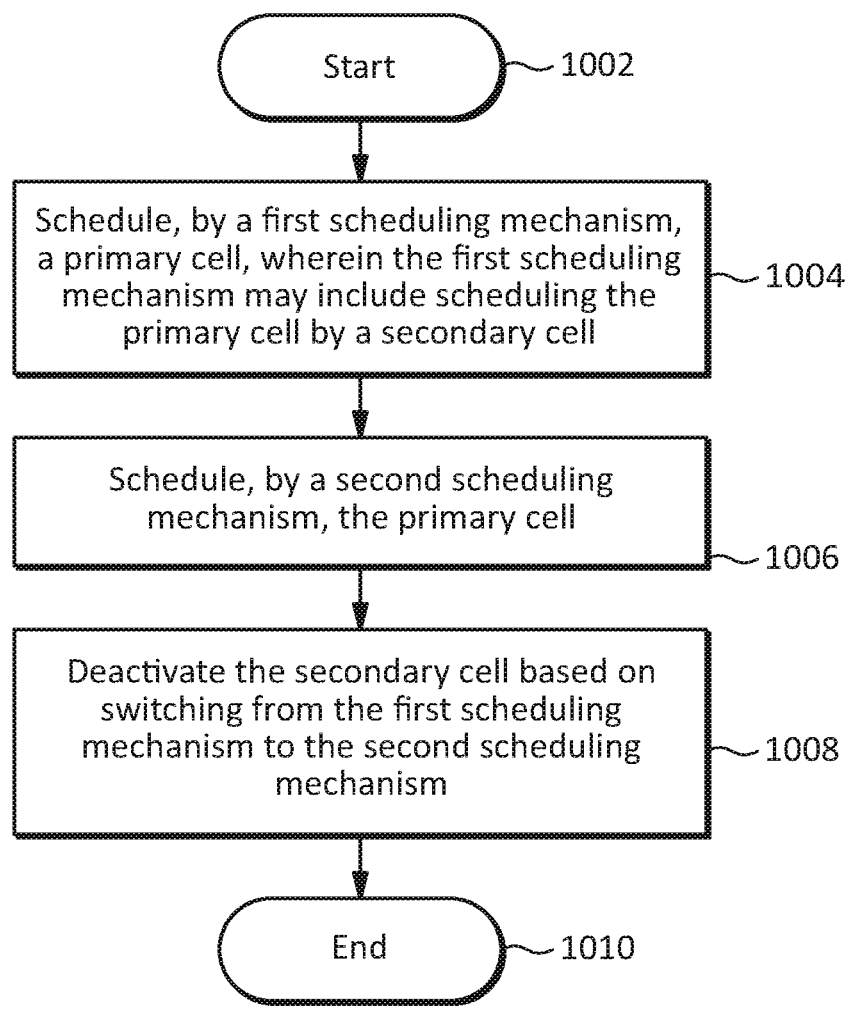
FIG. 10 illustrates an embodiment of a method for cross-carrier scheduling in a communication network in accordance with the disclosure.

FIG. 10 illustrates an embodiment of a method for cross-carrier scheduling in a communication network in accordance with the disclosure. The method may begin at operation 1002. At operation 1004, the method may schedule, by a first scheduling mechanism, a primary cell, wherein the first scheduling mechanism may include scheduling the primary cell by a secondary cell. At operation 1006, the method may schedule, by a second scheduling mechanism, the primary cell. At operation 1008, the method may deactivate the secondary cell based on switching from the first scheduling mechanism to the second scheduling mechanism. The method may end at operation 1010.

Figure 11:
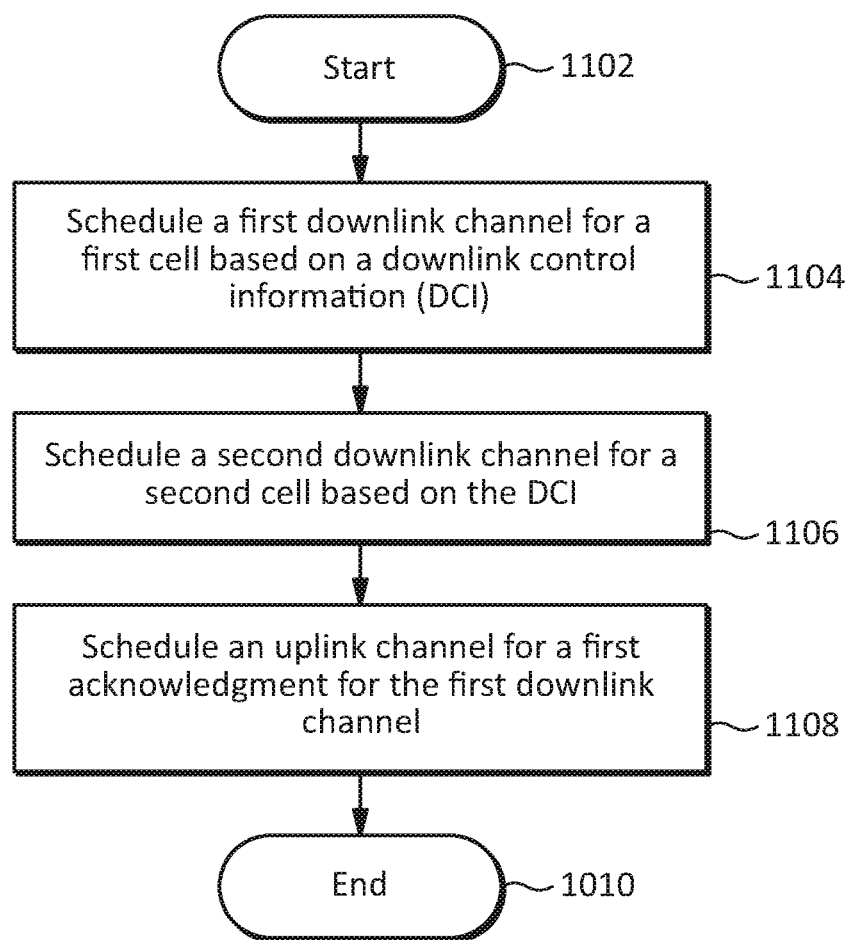
FIG. 11 illustrates another embodiment of a method for cross-carrier scheduling in a communication network in accordance with the disclosure.

FIG. 11 illustrates another embodiment of a method for cross-carrier scheduling in a communication network in accordance with the disclosure. The method may begin at operation 1102. At operation 1104, the method may schedule a first downlink channel for a first cell based on a downlink control information (DCI). At operation 1106, the method may schedule a second downlink channel for a second cell based on the DCI. At operation 1108, the method may schedule an uplink channel for a first acknowledgment for the first downlink channel. The method may end at operation 1110.

Figure 12:
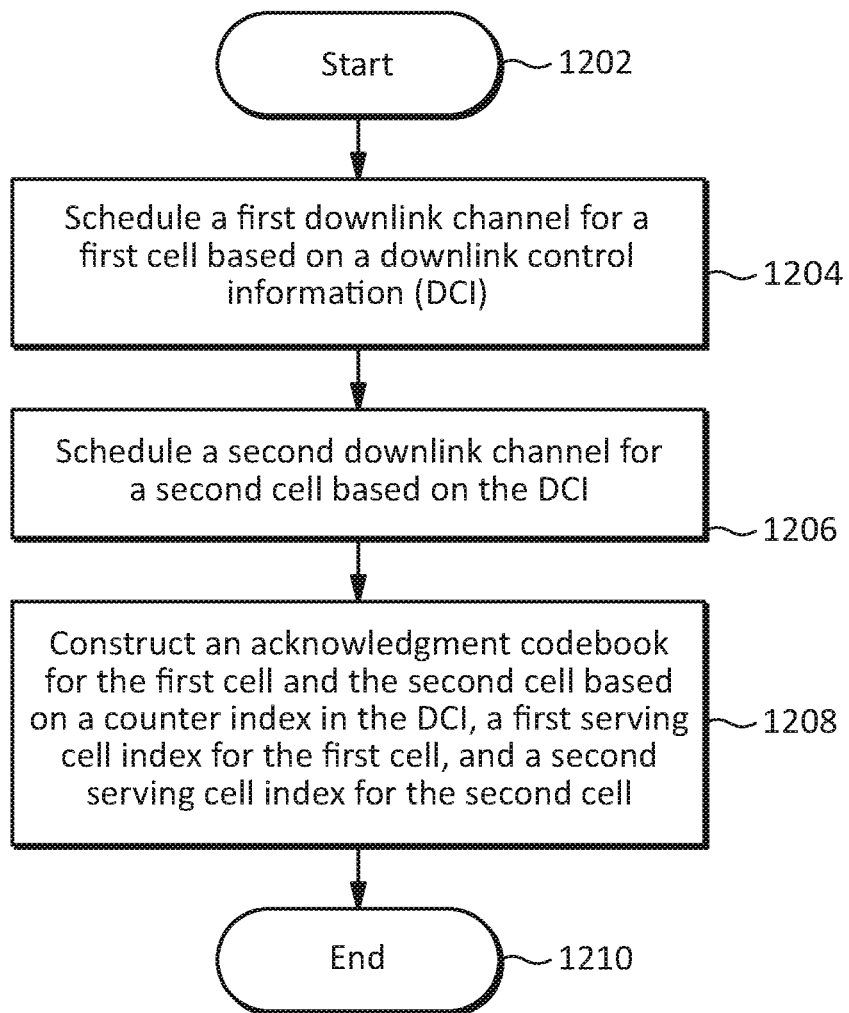
FIG. 12 illustrates a further embodiment of a method for cross-carrier scheduling in a communication network in accordance with the disclosure.

FIG. 12 illustrates a further embodiment of a method for cross-carrier scheduling in a communication network in accordance with the disclosure. The method may begin at operation 1202. At operation 1204, the method may schedule a first downlink channel for a first cell based on a downlink control information (DCI). At operation 1206, the method may schedule a second downlink channel for a second cell based on the DCI. At operation 1208, the method may construct an acknowledgment codebook for the first cell and the second cell based on a counter index in the DCI, a first serving cell index for the first cell, and a second serving cell index for the second cell. The method may end at operation 1210.

In the embodiment illustrated in FIGS. 10-12, as well as the other embodiments illustrated herein, the illustrated components and/or operations are exemplary only. Some embodiments may involve various additional components and/or operations not illustrated, and some embodiments may omit some components and/or operations. Moreover, in some embodiments, the arrangement of components and/or temporal order of the operations may be varied. Although some components may be illustrated as individual components, in some embodiments, some components shown separately may be integrated into single components, and/or some components shown as single components may be implemented with multiple components.

The embodiments disclosed herein may be described in the context of various implementation details, but the principles of this disclosure are not limited to these or any other specific details. Some functionality has been described as being implemented by certain components, but in other embodiments, the functionality may be distributed between different systems and components in different locations. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure. Various organizational aids such as section headings and the like may be provided as a convenience, but the subject matter arranged according to these aids and the principles of this disclosure are not defined or limited by these organizational aids.

Since the inventive principles of this patent disclosure may be modified in arrangement and detail without departing from the inventive concepts, such changes and modifications are considered to fall within the scope of the following claims.

APPENDIX 1

- a Type0-PDCCH CSS set configured by *pdcch-ConfigSIB1* in *MIB* or by *searchSpaceSIB1* in *PDCCH-ConfigCommon* or by *searchSpaceZero* in *PDCCH-ConfigCommon* for a DCI format with CRC scrambled by a SI-RNTI on the primary cell of the MCG

- a Type0A-PDCCH CSS set configured by *searchSpaceOtherSystemInformation* in *PDCCH-ConfigCommon* for a DCI format with CRC scrambled by a SI-RNTI on the primary cell of the MCG

- a Type1-PDCCH CSS set configured by *ra-SearchSpace* in *PDCCH-ConfigCommon* for a DCI format with CRC scrambled by a RA-RNTI, a MsgB-RNTI, or a TC-RNTI on the primary cell??

- a Type2-PDCCH CSS set configured by *pagingSearchSpace* in *PDCCH-ConfigCommon* for a DCI format with CRC scrambled by a P-RNTI on the primary cell of the MCG

- a Type3-PDCCH CSS set configured by *SearchSpace* in *PDCCH-Config* with *searchSpaceType = common* for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s), and

- a USS set configured by *SearchSpace* in *PDCCH-Config* with *searchSpaceType = ue-Specific* for DCI formats with CRC scrambled by C-RNTI, MCS-C-RNTI, SP-CSI-RNTI, CS-RNTI(s), SL-RNTI, SL-CS-RNTI, or SL-L-CS-RNTI.

APPENDIX 2

PDSCH processing time for PDSCH processing capability 1

| $\mu$ | PDSCH decoding time $N_1$ [symbols] | |
|---|---|---|
| | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

PDSCH processing time for PDSCH processing capability 2

| $\mu$ | PDSCH decoding time $N_1$ [symbols] |
|---|---|
| | dmrs-AdditionalPosition = pos0 in DMRS-DownlinkConfig in both of dmrs-DownlinkForPDSCH-MappingTypeA, dmrs-DownlinkForPDSCH-MappingTypeB |
| 0 | 3 |
| 1 | 4.5 |
| 2 | 9 for frequency range 1 |

PUSCH preparation time for PUSCH timing capability 1

| $\mu$ | PUSCH preparation time $N_2$ [symbols] |
|---|---|
| 0 | 10 |
| 1 | 12 |
| 2 | 23 |
| 3 | 36 |

PUSCH preparation time for PUSCH timing capability 2

| $\mu$ | PUSCH preparation time $N_2$ [symbols] |
|---|---|
| 0 | 5 |
| 1 | 5.5 |
| 2 | 11 for frequency range 1 |

APPENDIX 3

A UE does not expect to be configured CSS sets that result to corresponding total, or per scheduled cell, numbers of monitored PDCCH candidates and non-overlapped CCEs per slot that exceed the corresponding maximum numbers per slot.

For same cell scheduling or for cross-carrier scheduling where a scheduling cell and scheduled cell(s) have DL BWPs with same SCS configuration $\mu$, a UE does not expect a number of PDCCH candidates, and a number of corresponding non-overlapped CCEs per slot on a secondary cell to be larger than the corresponding numbers that the UE is capable of monitoring on the secondary cell per slot.

For cross-carrier scheduling, the number of PDCCH candidates for monitoring and the number of non-overlapped CCEs per slot are separately counted for each scheduled cell.

For all search space sets within a slot $n$, denote by $S_{css}$ a set of CSS sets with cardinality of $I_{css}$ and by $S_{uss}$ a set of USS sets with cardinality of $J_{uss}$. The location of USS sets $S_j$, $0 \leq j < J_{uss}$, in $S_{uss}$ is according to an ascending order of the search space set index.

Denote by $M_{S_{css}(i)}^{(L)}$, $0 \leq i < I_{css}$, the number of counted PDCCH candidates for monitoring for CSS set $S_{css}(i)$ and by $M_{S_{uss}(j)}^{(L)}$, $0 \leq j < J_{uss}$, the number of counted PDCCH candidates for monitoring for USS set $S_{uss}(j)$.

For the CSS sets, a UE monitors $M_{PDCCH}^{CSS} = \sum_{i=0}^{I_{css}-1} \sum_L M_{S_{css}(i)}^{(L)}$ PDCCH candidates requiring a total of $C_{PDCC}^{CSS}$ non-overlapping CCEs in a slot.

The UE allocates PDCCH candidates for monitoring to USS sets for the primary cell having an active DL BWP with SCS configuration $\mu$ in a slot if the UE is not provided *PDCCHMonitoringCapabilityConfig* for the primary cell or if the UE is provided *PDCCHMonitoringCapabilityConfig = R15 PDCCH monitoring capability* for all serving cells, or in a span if the UE is provided *PDCCHMonitoringCapabilityConfig = R16 PDCCH monitoring capability* for the primary cell, according to the following pseudocode. If for the USS sets for scheduling on the primary cell the UE is not provided *CORESETPoolIndex* for first CORESETs, or is provided *CORESETPoolIndex* with value 0 for first CORESETs, and is provided *CORESETPoolIndex* with value 1 for second CORESETs, and if $min\left(\gamma \cdot M_{PDCCH}^{max,slot,\mu}, M_{PDCCH}^{total,slot,\mu}\right) >$ $min\left(M_{PDCCH}^{max,slot,\mu}, M_{PDCCH}^{total,slot,\mu}\right)$ or $min\left(\gamma \cdot C_{PDCCH}^{max,slot,\mu}, C_{PDCCH}^{total,slot,\mu}\right) > min\left(C_{PDCCH}^{max,slot,\mu}, C_{PDCCH}^{total,slot,\mu}\right)$, the following pseudocode applies only to USS sets associated with the first CORESETs. A UE does not expect to monitor PDCCH in a USS set without allocated PDCCH candidates for monitoring.

Denote by $V_{CCE}(S_{uss}(j))$ the set of non-overlapping CCEs for search space set $S_{uss}(j)$ and by $\mathcal{C}(V_{CCE}(S_{uss}(j)))$ the cardinality of $V_{CCE}(S_{uss}(j))$ where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \le k \le j$.

Set $M_{PDCCH}^{uss} = min\left(M_{PDCCH}^{max,slot,\mu}, M_{PDCCH}^{total,slot,\mu}\right) - M_{PDCCH}^{css}$ Set $C_{PDCCH}^{uss} = min\left(C_{PDCCH}^{max,slot,\mu}, C_{PDCCH}^{total,slot,\mu}\right) - C_{PDCCH}^{css}$ Set $j = 0$ while $\sum_L M_{S_{uss}(j)}^{(L)} \le M_{PDCCH}^{uss}$ AND $\mathcal{C}(V_{CCE}(S_{uss}(j))) \le C_{PDCCH}^{uss}$ allocate $\sum_L M_{S_{uss}(j)}^{(L)}$ PDCCH candidates for monitoring to USS set $S_{uss}(j)$ $M_{PDCCH}^{uss} = M_{PDCCH}^{uss} - \sum_L M_{S_{uss}(j)}^{(L)}$;

$C_{PDCCH}^{uss} = C_{PDCCH}^{uss} - \mathcal{C}(V_{CCE}(S_{uss}(j)))$;

$j = j + 1$;

end while

APPENDIX 4

With reference to slots for PUCCH transmissions, when a UE receives in a PDSCH an activation command [11, TS 38.321] for a secondary cell ending in slot $n$, the UE applies the corresponding actions in [11, TS 38.321] no later than the minimum requirement defined in [10, TS 38.133] and no earlier than slot $n+k$, except for the following:

- the actions related to CSI reporting on a serving cell that is active in slot $n+k$

- the actions related to the *sCellDeactivationTimer* associated with the secondary cell [11, TS 38.321] that the UE applies in slot $n+k$

- the actions related to CSI reporting on a serving cell which is not active in slot $n+k$ that the UE applies in the earliest slot after $n+k$ in which the serving cell is active.

The value of $k$ is $k_1 + 3 \cdot N_{slot}^{subframe,\mu} + 1$ where $k_1$ is a number of slots for a PUCCH transmission with HARQ-ACK information for the PDSCH reception and is indicated by the PDSCH-to-HARQ_feedback timing indicator field in the DCI format scheduling the PDSCH reception as described in Clause 9.2.3 and $N_{slot}^{subframe,\mu}$ is a number of slots per subframe for the SCS configuration $\mu$ of the PUCCH transmission.

With reference to slots for PUCCH transmissions, if a UE receives a deactivation command [11, TS 38.321] for a secondary cell ending in slot $n$, the UE applies the corresponding actions in [11, TS 38.321] no later than the minimum requirement defined in [10, TS 38.133], except for the actions related to CSI reporting on an activated serving cell which the UE applies in slot $n+k$.

If the *sCellDeactivationTimer* associated with the secondary cell expires in slot $n$, the UE applies the corresponding actions in [11, TS 38.321] no later than the minimum requirement defined in [10, TS 38.133], except for the actions related to CSI reporting on an activated serving cell which the UE applies in the first slot that is after slot $n + 3 \cdot N_{slot}^{subframe,\mu}$ where $\mu$ is the SCS configuration for PDSCH reception on the secondary cell.

APPENDIX 5

A value of the counter downlink assignment indicator (DAI) field in DCI formats denotes the accumulative number of {serving cell, PDCCH monitoring occasion}-pair(s) in which PDSCH reception(s) or SPS PDSCH release associated with the DCI formats is present up to the current serving cell and current PDCCH monitoring occasion, first in ascending order of serving cell index and then in ascending order of PDCCH monitoring occasion index $m$, where $0 \leq m < M$. The value of the total DAI, when present [5, TS 38.212], in a DCI format denotes the total number of {serving cell, PDCCH monitoring occasion}-pair(s) in which PDSCH reception(s) or SPS PDSCH release associated with DCI formats is present, up to the current PDCCH monitoring occasion $m$ and is updated from PDCCH monitoring occasion to PDCCH monitoring occasion. Denote by $N_{C-\text{DAI}}^{\text{DL}}$ the number of bits for the counter DAI and set $T_D = 2^{N_{C-\text{DAI}}^{\text{DL}}}$. Denote by $V_{C-\text{DAI},c,m}^{\text{DL}}$ the value of the counter DAI in a DCI format scheduling PDSCH reception or SPS PDSCH release on serving cell $c$ in PDCCH monitoring occasion $m$ according to Table 9.1.3-1 or Table 9.1.3-1A. Denote by $V_{T-\text{DAI},m}^{\text{DL}}$ the value of the total DAI in a DCI format in PDCCH monitoring occasion $m$ according to Table 9.1.3-1. The UE assumes a same value of total DAI in all DCI formats that include a total DAI field in PDCCH monitoring occasion $m$.

If the UE transmits HARQ-ACK information in a PUCCH in slot $n$ and for any PUCCH format, the UE determines the $\tilde{o}_0^{ACK}, \tilde{o}_1^{ACK}, \ldots, \tilde{o}_{O^{ACK}-1}^{ACK}$, for a total number of $O_{ACK}$ HARQ-ACK information bits, according to the following pseudo-code:

Set $m=0$ – PDCCH with DCI format scheduling PDSCH reception or SPS PDSCH release monitoring occasion index: lower index corresponds to earlier PDCCH monitoring occasion Set $j=0$ Set $V_{temp}=0$ Set $V_{temp2}=0$ Set $V_s = \emptyset$ Set $N_{\text{cells}}^{\text{DL}}$ to the number of serving cells configured by higher layers for the UE

- if, for an active DL BWP of a serving cell, the UE is not provided *CORESETPoolIndex* or is provided *CORESETPoolIndex* with value 0 for one or more first CORESETs and is provided *CORESETPoolIndex* with value 1 for one or more second CORESETs, and is provided *ACKNACKFeedbackMode = JointFeedback,* the serving cell is counted two times where the first time corresponds to the first CORESETs and the second time corresponds to the second CORESETs Set $M$ to the number of PDCCH monitoring occasion(s)

while $m < M$

Set $c = 0$ – serving cell index: lower indexes correspond to lower RRC indexes of corresponding cell while $c < N_{cells}^{DL}$ if PDCCH monitoring occasion $m$ is before an active DL BWP change on serving cell $c$ or an active UL BWP change on the PCell and an active DL BWP change is not triggered in PDCCH monitoring occasion $m$ $$c = c + 1;$$

else if there is a PDSCH on serving cell $c$ associated with PDCCH in PDCCH monitoring occasion $m$, or there is a PDCCH indicating SPS PDSCH release on serving cell $c$ if $V_{C-DAI,c,m}^{DL} \leq V_{temp}$ $$j = j + 1$$

end if $$V_{temp} = V_{C-DAI,c,m}^{DL}$$

if $V_{T-DAI,m}^{DL} = \varnothing$ $$V_{temp2} = V_{C-DAI,c,m}^{DL}$$

else $$V_{temp2} = V_{\text{T-DAI},m}^{\text{DL}}$$

end if if *harq-ACK-SpatialBundlingPUCCH* is not provided and the UE is configured by *maxNrofCodeWordsScheduledByDCI* with reception of two transport blocks for at least one configured DL BWP of at least one serving cell, $\tilde{o}_{2 \cdot T_D \cdot j + 2(V_{C-DAI,c,m}^{DL} - 1)}^{ACK}$ = HARQ-ACK information bit corresponding to the first transport block of this cell $\tilde{o}_{2 \cdot T_D \cdot j + 2(V_{C-DAI,c,m}^{DL} - 1)+1}^{ACK}$ = HARQ-ACK information bit corresponding to the second transport block of this cell $$V_S = V_S \cup \{2 \cdot T_D \cdot j + 2(V_{C-\text{DAI},c,m}^{\text{DL}} - 1),\ 2 \cdot T_D \cdot j + 2(V_{C-\text{DAI},c,m}^{\text{DL}} - 1) + 1\}$$

elseif *harq-ACK-SpatialBundlingPUCCH* is provided to the UE and $m$ is a monitoring occasion for PDCCH with a DCI format that supports PDSCH reception with two transport blocks and the UE is configured by *maxNrofCodeWordsScheduledByDCI* with reception of two transport blocks in at least one configured DL BWP of a serving cell, $\tilde{o}_{T_D \cdot j + V_{C-DAI,c,m}^{DL} - 1}^{ACK}$ = binary AND operation of the HARQ-ACK information bits corresponding to the first and second transport blocks of this cell $$V_S = V_S \cup \{T_D \cdot j + V_{C-\text{DAI},c,m}^{\text{DL}} - 1\}$$

else $\tilde{o}_{T_D \cdot j + V_{C-DAI,c,m}^{DL} - 1}^{ACK}$ = HARQ-ACK information bit of this cell $$V_S = V_S \cup \{T_D \cdot j + V_{C-\text{DAI},c,m}^{\text{DL}} - 1\}$$

end if end if $$c = c+1$$

end if end while $$m = m+1$$

end while if $V_{temp2} < V_{temp}$ $$j = j+1$$

end if

The invention claimed is:

1. A method for cross-carrier scheduling in a communication network, the method comprising:
scheduling a first downlink channel for a first cell based on a downlink control information (DCI);
scheduling a second downlink channel for a second cell based on the DCI;
scheduling an uplink channel for a first acknowledgment for the first downlink channel; and
scheduling the uplink channel for a second acknowledgment for the second downlink channel.

2. The method of claim 1, wherein the uplink channel is scheduled within an uplink slot, the method further comprising determining the uplink slot.

3. The method of claim 2, wherein the uplink slot is determined based, at least in part, on at least one parameter provided by the DCI.

4. The method of claim 3, wherein the at least one parameter comprises a feedback timing indicator.

5. The method of claim 3, wherein the at least one parameter comprises a time domain resource allocation (TDRA).

6. The method of claim 3, wherein the at least one parameter comprises a physical uplink control channel (PUCCH) resource indicator (PRI).

7. The method of claim 3, wherein the at least one parameter is provided in a field of the DCI.

8. The method of claim 2, wherein the uplink slot is determined based, at least in part, on a reference reception.

9. The method of claim 8, wherein the reference reception comprises the first downlink channel.

10. The method of claim 2, wherein the uplink slot is determined based, at least in part, on a reference cell.

11. The method of claim 1, wherein the uplink channel is scheduled within an uplink slot, the method further comprising determining the uplink slot based, at least in part, on a feedback timing indicator provided in a field of the DCI; and
a reference reception.

12. The method of claim 11, wherein the uplink channel comprises a physical uplink control channel (PUCCH).

13. A device comprising:
a transceiver configured to access a communication network comprising a first cell and a second cell; and
a device controller configured to:
receive a downlink control information (DCI) scheduling a first downlink channel for the first cell and a second downlink channel for the second cell;
transmit, using an uplink channel, a first acknowledgment for the first downlink channel; and
transmit, using the uplink channel, a second acknowledgment for the second downlink channel.

14. The device of claim 13, wherein the uplink channel is scheduled within an uplink slot, and the device controller is further configured to determine the uplink slot based, at least in part, on at least one parameter in the DCI.

15. The device of claim 13, wherein the uplink channel is scheduled within an uplink slot, and the device controller is further configured to determine the uplink slot based, at least in part, on a reference reception.

16. The device of claim 13, wherein the uplink channel is scheduled within an uplink slot, the uplink channel comprises a physical uplink control channel (PUCCH), and the device controller is further configured to determine the uplink slot based, at least in part, on:
a feedback timing indicator in a field of the DCI; and
a reference reception.

17. An apparatus comprising:
a transceiver configured to access a communication network comprising a first cell and a second cell; and
a controller configured to:
transmit a downlink control information (DCI) scheduling a first downlink channel for the first cell and a second downlink channel for the second cell;
receive, using an uplink channel, a first acknowledgment for the first downlink channel; and
receive, using the uplink channel, a second acknowledgment for the second downlink channel.

18. The apparatus of claim 17, wherein the uplink channel is scheduled within an uplink slot, and the controller is further configured to determine the uplink slot based, at least in part, on at least one parameter of the DCI.

19. The apparatus of claim 17, wherein the uplink channel is scheduled within an uplink slot, and the controller is further configured to determine the uplink slot based, at least in part, on a reference transmission.

20. The apparatus of claim 17, wherein the uplink channel is scheduled within an uplink slot, the uplink channel comprises a physical uplink control channel (PUCCH), and the controller is further configured to determine the uplink slot based, at least in part, on:
a feedback timing indicator in a field of the DCI; and
a reference transmission.

* * * * *